April 24, 1962 — J. FRIEDMAN — 3,030,881
ENGRAVING APPARATUS FOR ROUND WORK
Filed Sept. 15, 1959 — 2 Sheets-Sheet 1
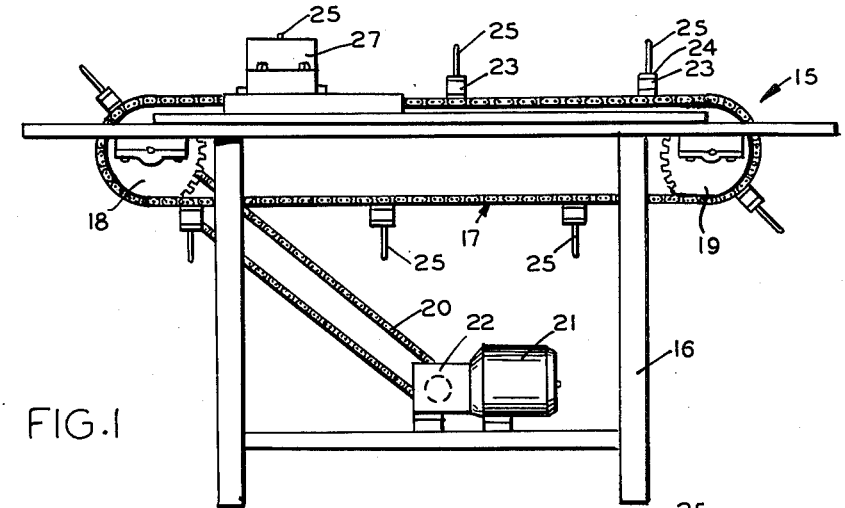
FIG.1
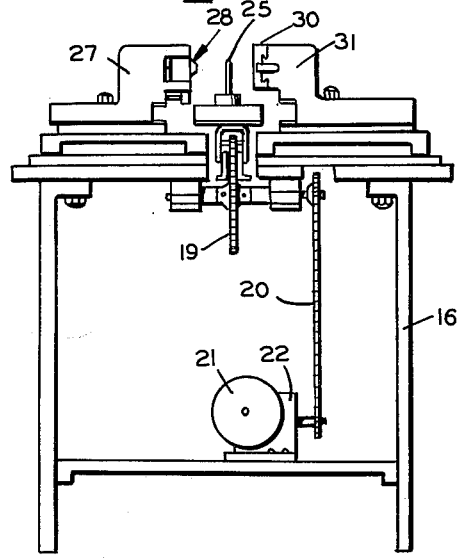
FIG.2
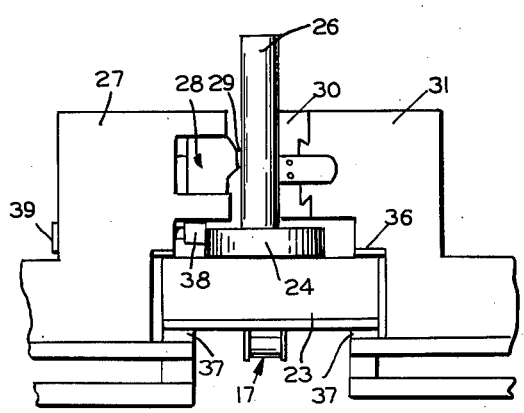
FIG.3
*INVENTOR,*
JEROME FRIEDMAN
BY 
ATTORNEY April 24, 1962    J. FRIEDMAN    3,030,881
ENGRAVING APPARATUS FOR ROUND WORK
Filed Sept. 15, 1959    2 Sheets-Sheet 2
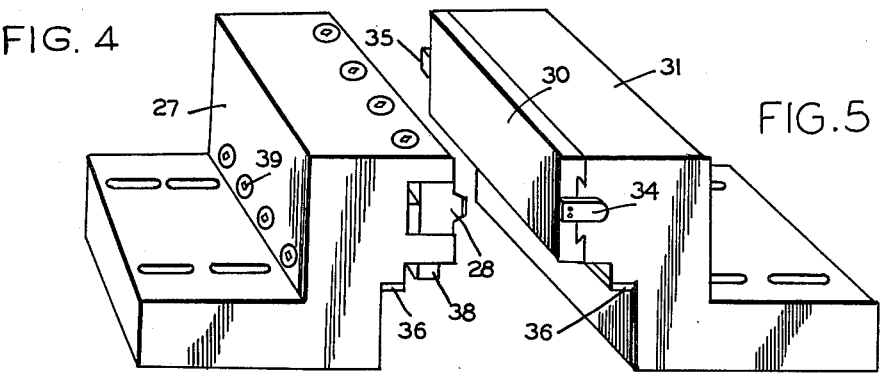
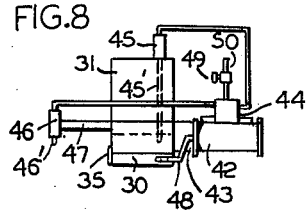
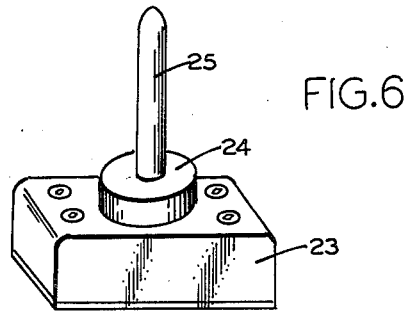
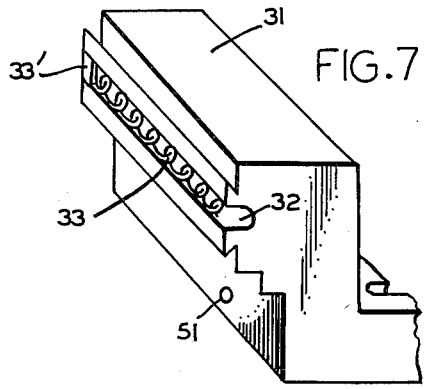
*INVENTOR,*
JEROME FRIEDMAN,
BY
ATTORNEY.

United States Patent Office 3,030,881
Patented Apr. 24, 1962

3,030,881
ENGRAVING APPARATUS FOR ROUND WORK

Jerome Friedman, 36 Eastwood Lane, Valley Stream, N.Y.

Filed Sept. 15, 1959, Ser. No. 840,078
1 Claim. (Cl. 101—7)

The present invention relates to apparatus for engraving on cylindrical surfaces of articles which are tubular or solid.

An object of this invention is to provide novel and improved engraving machines of the character mentioned, in which the die operates on articles carried on a straight stretch of a continuously moving endless conveyor belt structure.

Another object thereof is to provide novel and improved machines of the type described, for engraving on cylindrical surfaces by the use of a flat die in cooperation with a backing member so that the die bears with proper pressure against the work in its passage through the machine and yet is not marred by its contact with the backing member which is flat.

A further object thereof is to provide novel and improved engraving apparatus for cylindrical work employing a flat die and in each instance having a flat backing member which moves along with the conveyed work during the engraving operation and automatically returns to a start position ready to receive the next work piece brought by the conveyor to engraving station.

A further object of this invention is to provide novel and improved engraving apparatus of the types set forth in which the depth of the engraving is adjustable and controlled to be uniform even where only a corner of a die character is in contact with the work.

Another object thereof is to provide novel and improved engraving apparatus of the kind described, in which the flat backing member is moved by independent means controlled by movement of the work to avoid drag on the work piece and incident marring of the engraving performed thereon.

Still a further object of this invention is to provide novel and improved engraving apparatus of the nature set forth, which is simple in construction, reasonable in cost, easy to set up for operation, positive in action and efficient in carrying out the purposes for which it is designed.

Other objects and advantages will become apparent as this disclosure proceeds.

For the practice of this invention, one form it may assume is to have a holder in which a flat engraving die is positioned horizontally to present its characters vertically. Directly opposite and spaced from said characters, there is a backing plate positioned vertically and slidable horizontally on another holder. Both said holders are adjustably fixed to frame. Below said die and backing plate and between said holders thereof along the length of the die and backing plate, there is a straight stretch of a moving endless conveyor belt structure carrying suitably spaced article holders which are free to rotate. Each article holder includes an independently rotatable wheel. To hold tubular cylindrical articles, there is a mandrel centrally positioned through said wheel and independently rotatable on the article holder. This mandrel extends between the die and the backing plate in its passage. When a work piece on the mandrel, is between a die character and said backing plate, it is in pressure contact with both of them. The backing plate is normally at an initial rest position on its holder and is spring-loaded to automatically return to such position after it is moved by its contact with the work piece and freed thereof, so that said backing plate is in proper position to cooperate with the next work piece conveyed to it. There is a bar on the die holder, below and along the die, which engages the mentioned wheel to rotate it. The position of this bar which is adjustable, fixes the depth of impression made by the die in the work piece. For cylindrical solid articles, instead of the mandrel which is removed, the work holder is provided with a suitable socket to receive the work piece. This description so far, sets forth a general example. A detailed description of the embodiments illustrated herein and an explanation of their operation will now be given.

In the accompanying drawings, similar characters of reference indicate corresponding parts in all the views:

FIG. 1 is an elevational view along a side of a machine embodying the teachings of this invention; the front of this machine being at the right.

FIG. 2 is a front view of said machine.

FIG. 3 is an enlarged fragmentary section taken at lines 3—3 in FIG. 1.

FIG. 4 is a perspective view showing the die in its holder, drawn to an enlarged scale.

FIG. 5 is an enlarged perspective view of the backing plate on its holder.

FIG. 6 is an enlarged perspective view showing a work holder for a tubular cylindrical item.

FIG. 7 is an enlarged perspective view of the backing plate holder showing the spring means used to retract the backing plate.

FIG. 8, drawn to the scale of FIG. 1, is a top plan view of the backing plate and its holder associated with means for moving the plate as the work piece rolls on the die.

In the drawings which show a preferred embodiment of this invention, the numeral 15 designates generally an engraving machine which comprises a frame 16 carrying an endless chain belt conveyor 17 positioned with its straight stretches horizontally and mounted on a pair of rotatably mounted sprockets 18, 19, one of which is driven by belt or chain drive 20 from an electric motor 21 coupled with a suitable reduction gear device 22. At suitably spaced positions along the conveyor belt 17, there are secured thereto the blocks 23 which preferably are equi-spaced. Each of these blocks has a suitable holding device for an article to be engraved. Each such holder in the embodiment shown, is rotatably mounted on its associated block and includes a free horizontally positioned wheel 24, thru which there centrally extends an arbor 25 to receive theron a piece of work which is tubular and cylindrical, as 26. The axes of all mandrels or arbors 25, are of course coplanar.

Nearer to the rear of the machine 15, the frame 16 carries a holder 27 for a flat engraving die 28 which extends horizontally at one side of the mandrels 25, so that the engraving characters 29 thereof are in vertical plane facing the common axis plane of said mandrels. To the other side of said mandrels, there is a vertically positioned backing plate 30 which is opposite the die 28 and is slidably mounted for horizontal movement on a holder therefor indicated by the numeral 31. Said holders 27 and 31 are adjustable on the frame, and are set apart so, that when the work piece 26 is between the die 28 and the slidable backing plate 30, it contacts both of them under appreciable pressure sufficient to accomplish the engraving thereon, as shown in FIG. 3.

The backing plate holder 31 is provided with a lengthwise channel 32 which is closed by an element 33' at the end thereof which is last passed by a work piece on the moving conveyor belt 17. Within this channel, there is a compression coil spring 33 to be acted on by the finger 34 which extends from the backing plate 30 into said channel 32. The numeral 35 denotes an element extending from said backing plate to act as a stop against the body of the holder 31. The backing plate 30 is thus spring-loaded to come to an initial rest position, which occurs when the stop element contacts the holder 31.

When a work holder enters between the die holder 27 and the backing plate holder 31, the block 23 is in snug sliding fit with the hardened strips 36, 37 extending along said holders, so that the work piece 26 shall travel true. At least the forward corners of the carrier block 23 are rounded as shown at 23' to facilitate entrance thereof between said positioning strips 36, 37. Also, when the block 23 enters between said holders 27, 31, and continuing for the period it remains between them, said work-holding block's wheel 24 is in rolling contact with the horizontal bar 38 which is along the die holder in the instance shown. This bar is properly aligned by use of the set screws 39 so that the depth of impression made by the die characters in the work is uniform and its depth determined.

For work pieces as 26 which are tubular, the mandrel 25 may have the wheel 24 journalled thereon to rotate as a loose collar resting on the block 23. For cylindrical work pieces which are solid or of appreciable wall thickness, the mandrel 25 is omitted, in which event the wheel 24 at its center, presents a suitable socket for setting in the work piece which is free to revolve independently of said wheel.

The machine of FIG. 1 is set up to attain the operating condition shown in FIG. 3 and the motor 21 is run. An operator sets a work piece 26 on each mandrel 25 when the mandrel is upright over the sprocket 19 which is rotating counter-clockwise. As soon as the wheel 24 comes into rolling contact with the bar 38, The work piece 26 comes into rolling contact with the backing plate 30. However as soon as said work piece contacts the first character of the engraving die 28, the work piece ceases to roll on the backing plate and causes it to slide in the direction the work is going with the conveyor belt 17. At the completion of the engraving operation, when the work piece leaves the die 28, the stressed spring 33 becomes free to bring the backing plate back to its initial rest position determined by the stop 35 when the latter contacts the backing plate holder 31. The machine is now ready to act upon the next work piece transported to the engraving station. If desired, in the region of the sprocket wheel 18, the machine may be provided with a suitable means (not shown) to strip the finished work from off the mandrels passing it. This machine works in identical fashion on cylindrical work of solid nature, in which instance there are no mandrels, but suitable sockets as heretofore explained.

For engraving flat work, the engraving die is a rotatably mounted wheel 40 having engraving characters 41 on its periphery, acting on the work in conjunction with the automatically retractable backing plate 30, with a suitable conveyor including a constantly moving endless belt, not shown but readily understood by those versed in the machine art.

For specially exact work, there should be no slippage or drag on the work piece with respect to the backing plate 30. To accomplish this, the amount of linear travel of any point on the backing plate, should be exactly the amount of arcual travel of any point on the curved surface of the work piece. So I provide a single acting cylinder 42, on and in front of the backing plate holder 31, supported above the top plane of such holder on a bracket 43. The numeral 44 indicates the control valve for such cylinder, equipped with limit valves 45 and 46, whose operating members are denoted by the numerals 45' and 46' respectively; the latter limit valve being mounted on the bracket 47. The piston rod 48 of said cylinder 42, has a forward off-set and is secured to the backing plate 30. A needle-valve 49 adjusts the flow of compressed air fed into intake 50. The length of stroke of the cylinder's piston is at least the length of the engraving die 28. The valve 49 is adjusted so that the linear travel of the backing plate 30 shall be exactly the arcual travel of the work piece 26 on its arbor 25. The operating member 45' lying through the hole 51, is contacted and operated by the block 23, somewhat before the work piece 26 contacts the engraving die 28. This operates the piston of the cylinder 42 to move to the left in FIG. 8. When the work piece has passed the engraving die, the stop element 35 will contact and operate the operating member 46' of the limit valve 46, whereupon the cylinder 42 is opened to permit spring-actuated return of the backing plate 30 to its initial start position. The cylinder and its control valves 44, 45, 46 are associated with proper hose connections. All this is well known in the art of cylinder control and are products of commerce, as for instance the cylinder model H–42 and the control valves model 402A set forth in the 1959 Industrial Air Power Catalog of the Mead Specialties Co., Chicago, Illinois. If desired, it is evident that a double-acting cylinder can be used for more rapid action, in which event the spring 33 may be included to aid quick return, or it may be omitted.

It is important to note that the term "engraving" appearing anywhere in this specification, the appended claim and in the title of this invention, shall be deemed to mean and include embossing, intaglio and the like, and that all such terms shall be deemed synonymous and as if all appeared where the term "engraving" appears.

This invention is capable of various forms and numerous applications without departing from the essential features herein disclosed. It is therefore intended and desired that the embodiments herein shall be deemed illustrative and not restrictive and that the patent shall cover all patentable novelty herein set forth; reference being had to the following claim rather than to the specific description herein to indicate the scope of this invention.

I claim:

In an engraving machine of the character described, a frame, an endless conveyor belt, means on the frame, mounting said belt for movement along its length on the frame; said belt presenting a straight stretch, means for moving said belt in a predetermined direction on its mounting means, an article holder rotatably mounted on the belt, an elongated engraving die fixed on the frame parallel to the direction of movement of said belt stretch, a backing plate of rigid material extending parallel to the direction of movement of said belt stretch, positioned opposite said die and slidably mounted on the frame for reciprocatory movement from a predetermined start position, along a line parallel to the direction of movement of said belt stretch; said article holder entering between said die and backing member and leaving them upon movement of said belt; the space between said die and backing plate being such that when said article holder having an article of work thereon enters between said die and backing plate, said article of work will be pressed against said die by said backing plate to engage said die and be in rolling engagement therewith, powered means to move the backing plate at a predetermined speed for a predetermined distance in the direction of movement of said straight belt stretch when the article of work contacts the die whereby at all times only said backing plate is moved by action of said powered means; the relative movement of the article of work and said die, being accomplished only by the movement of said belt and the rolling engagement of the article of work and said die during movement of said belt whereby the engraving performed by the die on the article of work is unmarred and means to move said backing plate back to its start position when the article of work leaves said die at the completion of the engraving operation.

References Cited in the file of this patent

UNITED STATES PATENTS

| | | |
|---|---|---|
| 937,661 | Van Brunt | Oct. 19, 1909 |
| 1,817,788 | Vorbeck | Aug. 4, 1931 |
| 1,892,545 | Ward | Dec. 27, 1932 |
| 2,015,669 | Gravely et al. | Oct. 1, 1935 |
| 2,244,592 | Youngs | June 3, 1941 |
| 2,796,164 | Hakogi | June 18, 1957 |